United States Patent
Huang et al.

(10) Patent No.: US 11,320,449 B2
(45) Date of Patent: May 3, 2022

(54) VISUALIZATION DEVICE AND OBSERVATION METHOD FOR FLOW FIELD

(71) Applicant: Industrial Technology Research Institute, Hsinchu (TW)

(72) Inventors: Chih-Yung Huang, Taichung (TW); Yao-Hsien Liu, Hsinchu County (TW); Kuan-Chou Chen, Hsinchu (TW); Yi-Jiun Lin, Hsinchu County (TW); Shih-Chin Lin, Taipei (TW); Ching-Chiun Wang, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 283 days.

(21) Appl. No.: 16/701,073

(22) Filed: Dec. 2, 2019

(65) Prior Publication Data

US 2021/0132104 A1     May 6, 2021

(30) Foreign Application Priority Data

Nov. 1, 2019   (TW) .................................. 108139689

(51) Int. Cl.
   *G01P 13/00*           (2006.01)
(52) U.S. Cl.
   CPC ................. *G01P 13/0006* (2013.01)
(58) Field of Classification Search
   None
   See application file for complete search history.

(56) References Cited

U.S. PATENT DOCUMENTS

| 9,182,422 | B2 | 11/2015 | Hoshishima et al. |
| 9,751,057 | B2 * | 9/2017 | Wilson ............. B01L 3/502792 |
| 10,443,139 | B2 * | 10/2019 | Mills ....................... H02S 10/10 |

(Continued)

FOREIGN PATENT DOCUMENTS

| CN | 101894394 | 11/2010 |
| CN | 202256377 | 5/2012 |

(Continued)

OTHER PUBLICATIONS

A.K. Mohamed, et al., "Electron Beam Fluorescence in Hypersonic Facilities", Aerospace Lab Journal, Dec. 2009, pp. 1-9.

(Continued)

*Primary Examiner* — Elias Desta
(74) *Attorney, Agent, or Firm* — JCIPRNET (57) ABSTRACT

A visualization device for a flow field includes a chamber, a power supply, at least one pair of electrodes, and at least one flow field observation module. The flow field observation module includes a high-speed camera, a light detecting component, and a light filter component. The power supply outputs a voltage to generate a plasma, and the pair of electrodes is disposed in the chamber. The flow field observation module is disposed outside the chamber and captures an image of a fluid particle excited by the plasma toward the chamber. The light filter component is disposed between the high-speed camera and the chamber. The light detecting component obtains a light information within the chamber and sends the light information to the light filter component.

20 Claims, 6 Drawing Sheets

(56) References Cited

U.S. PATENT DOCUMENTS

| | | | |
|---|---|---|---|
| 2003/0090676 A1 | 5/2003 | Goebel et al. | |
| 2008/0137992 A1 | 6/2008 | Mori et al. | |
| 2012/0149126 A1* | 6/2012 | Wilson | C12N 13/00 |
| | | | 436/175 |
| 2016/0141154 A1 | 5/2016 | Kamata et al. | |
| 2016/0216100 A1 | 7/2016 | Kim et al. | |
| 2020/0154555 A1* | 5/2020 | Huang | H05H 1/4697 |

FOREIGN PATENT DOCUMENTS

| | | |
|---|---|---|
| CN | 102393193 | 5/2013 |
| CN | 103197095 | 8/2015 |
| TW | 200628395 | 8/2006 |
| TW | 200734062 | 9/2007 |
| TW | 201030342 | 8/2010 |
| TW | 201129775 | 9/2011 |
| TW | 201740076 | 11/2017 |
| TW | 201903386 | 1/2019 |
| TW | 201928337 | 7/2019 |
| TW | 201940834 | 10/2019 |
| WO | 2006006250 | 1/2006 |

OTHER PUBLICATIONS

C.P. Gendrich, et al., "A spatial correlation technique for estimating velocity fields using molecular tagging velocimetry (MTV)", Experiments in Fluids, Nov. 1996, pp. 67-77.

W. Scott Crawford, et al., "Design and Tuning of a Vacuum Microplasma Spray System Particle Entrainment", Surface Engineering in Materials Science III, Jan. 2005, pp. 267-282.

R Sosa, et al., "Electrical characteristics and influence of the air-gap size in a trielectrode plasma curtain at atmospheric pressure" Journal of Physics D: Applied Physics, Jan. 15, 2009, pp. 1-8.

Ho Jun Kim, et al.,"Effect of electrode spacing on the density distributions of electrons, ions, and metastable and radical molecules in SiH4/NH3/N2/He capacitively coupled plasmas", Journal of Applied Physics, Jul. 29, 2015, pp. 1-19.

T.C. Cheng, et al., "Visualization of mixed convective vortex rolls in an impinging jet flow of air through a cylindrical chamber", International Journal of Heat and Mass Transfer, Jan. 11, 2002, pp. 3357-3368.

"Office Action of Taiwan Counterpart Application", dated Dec. 29, 2020, p. 1-p. 4.

* cited by examiner

VISUALIZATION DEVICE AND OBSERVATION METHOD FOR FLOW FIELD

CROSS-REFERENCE TO RELATED APPLICATION

This application claims the priority benefit of Taiwan application serial no. 108139689, filed on Nov. 1, 2019. The entirety of the above-mentioned patent application is hereby incorporated by reference herein and made a part of this specification.

TECHNICAL FIELD

The disclosure relates to a visualization device and an observation method for a flow field.

BACKGROUND

In a traditional visualization analysis, laser is used as illumination to facilitate the image capture of a high-speed camera, and therefore the shape of the chamber and pumping affect particle turbulence, and the pressure needs to be in normal pressure range in order to effectively capture the particles. Therefore, the flow field of a low-pressure vacuum CVD (chemical vapor deposition) process may not be measured. In addition, plasma development may replace laser illumination using the characteristic of emitting light by exciting a fluid with plasma to perform visualization analysis. However, based on the light intensity of the plasma, the background brightness of the image capture, and the influence of the light band, etc., overexposure readily occurs during image capture with a high-speed camera, thus resulting in poor image capture effect, such that misjudgment in the particle image of the flow field occurs.

In addition, the traditional visualization analysis method using a laser light source has limited visualization image capture range for the flow field of low-pressure vacuum plasma development, and authenticity and accuracy thereof are insufficient. The traditional flow field visualization analysis method lacks detection techniques such as light intensity, so the optimal shot is difficult to obtain, and the image capture range of flow field visualization is limited and authenticity and accuracy thereof are insufficient.

SUMMARY

The disclosure provides a visualization device for a flow field and an observation method for a flow field.

The visualization device for the flow field of the disclosure includes a chamber, a power supply, at least one pair of electrodes, and at least one flow field observation module. The flow field observation module includes a high-speed camera, a light detecting component, and a light filter component. The power supply outputs a voltage to generate a plasma, and the pair of electrodes is disposed in the chamber. The flow field observation module is disposed outside the chamber and captures an image of a fluid particle excited by the plasma toward the chamber. The light filter component is disposed between the high-speed camera and the chamber, and the light detecting component is configured to obtain a light information in the chamber and send the light information to the light filter component.

The observation method for the flow field of the disclosure includes the following steps. A plasma is generated using a plasma generator disposed in a chamber. At least one flow field observation module is disposed outside the chamber. A light information in the chamber is obtained using a light detecting component of the flow field observation module and the light information is sent to a light filter component. An image of a fluid particle excited by the plasma is captured via the light filter component using a high-speed camera of the flow field observation module. In particular, the flow field observation module includes a high-speed camera, a light detecting component, and a light filter component, and the light detecting component and the light filter component are disposed between the high-speed camera and the chamber. The flow field observation module is disposed outside the chamber and captures an image of a fluid particle excited by the plasma toward the chamber.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

In the following, exemplary embodiments of the disclosure are comprehensively described with reference to figures, but the disclosure may also be implemented in various different forms and should not be construed as limited to the embodiments of the specification. For clarity, the relative thicknesses and locations of regions or structures may be reduced or enlarged. Moreover, similar or same reference numerals are used in each figure to represent similar or same elements.

Figure 1:
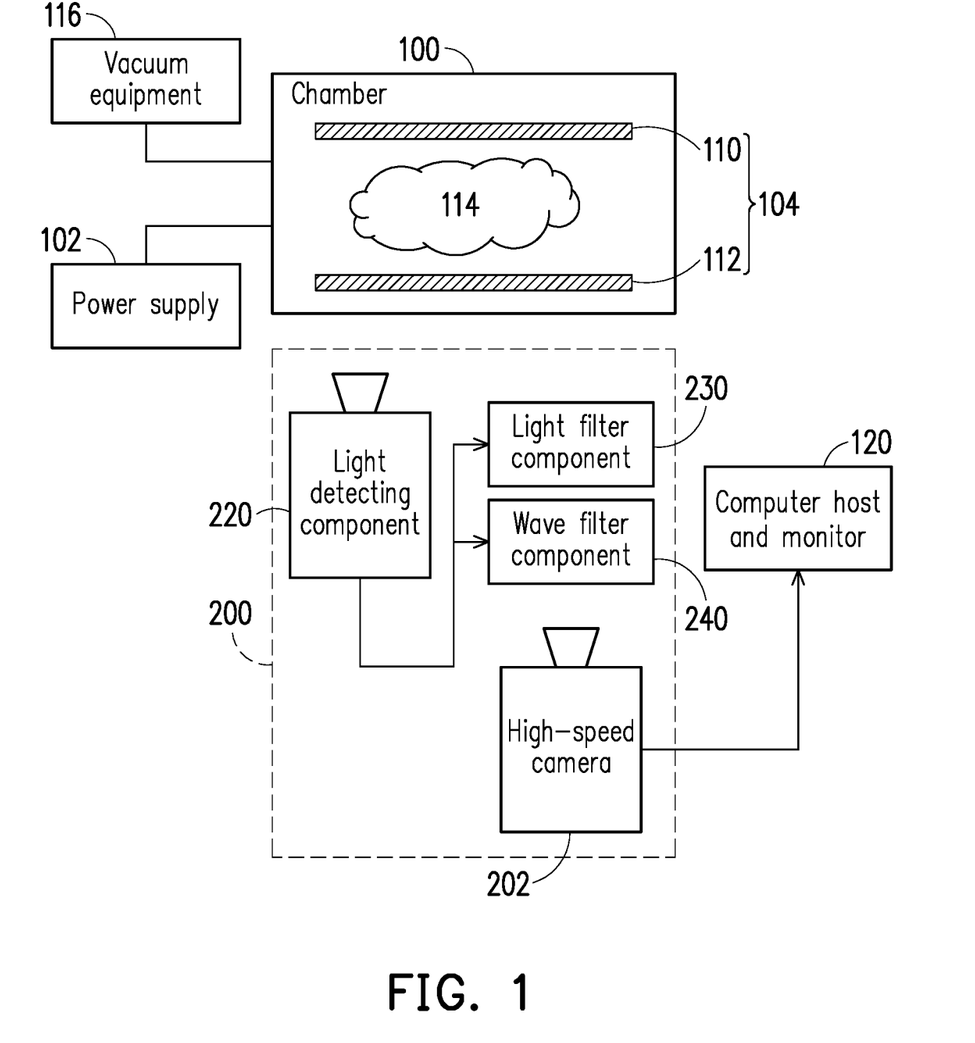
FIG. 1 is a schematic of a visualization device for a flow field according to the first embodiment of the disclosure.

FIG. 1 is a schematic of a visualization device for a flow field according to the first embodiment of the disclosure.

Referring to FIG. 1, a visualization device for a flow field of the first embodiment substantially includes a chamber 100, a power supply 102, a pair of electrodes 104, and a flow field observation module 200. The power supply 102 is configured to output a voltage to generate a plasma, and the power supply 102 is generally disposed outside the chamber 100 and electrically connected to the pair of electrodes 104 disposed in the chamber 100. The pair of electrodes 104 has a first electrode 110 and a second electrode 112. The pair of electrodes 104 may generate a plasma 114 by exciting a fluid (not shown) in the chamber 100 via the voltage from the power supply 102, wherein the fluid is, for example, an inert gas. The flow field observation module 200 is disposed outside the chamber 100 and captures an image of a fluid particle excited by the plasma 114 toward the chamber 100. The flow field observation module 200 includes a high-speed camera 202, a light detecting component 220, a light filter component 230, and a wave filter component 240. It is to be noted that, in an embodiment, the wave filter component 240 may be omitted, that is, only the light filter component 230 is provided.

In FIG. 1, the light detecting component 220, the light filter component 230, and the wave filter component 240 are disposed between the high-speed camera 202 and the chamber 100. The light detecting component 220 may obtain a light information in the chamber 100, such as at least one of light intensity information and light wavelength information and send the light information to at least one of the light filter component 230 and the wave filter component 240, and the high-speed camera 202 captures an image of a fluid particle excited by the plasma 114 toward the chamber 100 via at least one of the light filter component 230 and the wave filter component 240. The observation device for the flow field of the present embodiment may further include a vacuum equipment 116 configured to maintain a vacuum state within the chamber 100. In addition, in order to perform image analysis, a host computer and a monitor 120 may be provided to receive and analyze the image of the fluid particle captured by the flow field observation module 200.

According to an embodiment, the supply of high voltage to the pair of electrodes 104 generates the plasma 114, and the fluid is excited via the plasma 114 to emit light, and therefore the visualization image capture range of the flow field is enhanced. Then, by adjusting the frequency with the high-speed camera for global velocity field image capture, a three-dimensional flow field may be captured and analyzed.

Figure 2A:
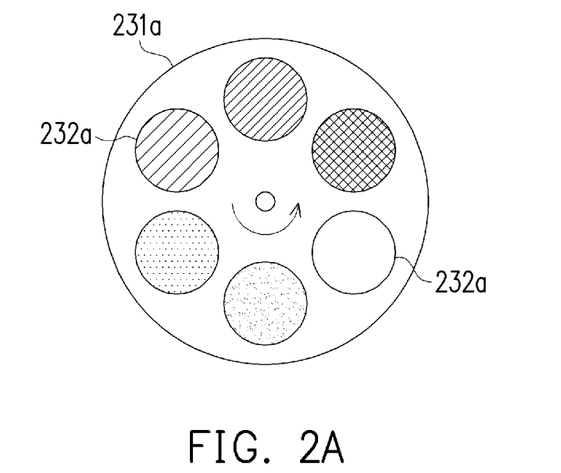
FIG. 2A and FIG. 2B are top and cross-sectional schematics of an example of a light filter component and a wave filter component in the visualization device for a flow field of the first embodiment.
Figure 2B:
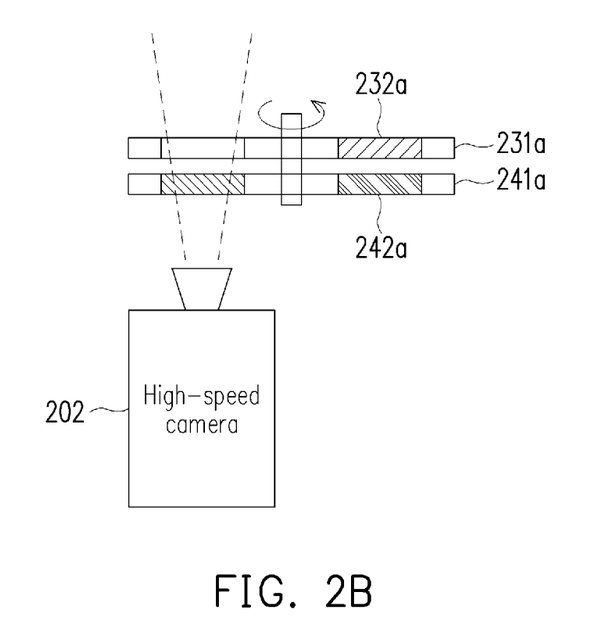

FIG. 2A and FIG. 2B are schematics of an embodiment of a light filter component and a wave filter component in the visualization device for a flow field of the first embodiment. Referring to FIG. 1, FIG. 2A, and FIG. 2B, the light filter component 230 includes a first carrier 231a and a plurality of light filter units 232a, each of the light filter units 232a contains, for example, a light filter, and each light filter has different light blocking properties to filter different light intensities. Similarly, the wave filter component 240 includes a second carrier 241a and a plurality of wave filter units 242a. Each of the wave filter units 242a contains, for example, a wave filter, and each wave filter has a different filter band. In an embodiment, each light filter has different light blocking properties that attenuate the intensity value of the light and change the spectral composition of the light to filter the light intensity suitable for the high-speed camera 202 for image capture. In another embodiment, each wave filter has a different wave filter band, and the range band light suitable for the high-speed camera 202 for image capture may be selected by filtering and unsuitable range band light may be shielded by filtering. It is to be noted that, in an embodiment, the wave filter component 240 may be omitted, that is, only the light filter component 230 is provided.

In the present embodiment, the first carrier 231a and the second carrier 241a have the shape of a disk, and the plurality of light filter units 232a and the plurality of wave filter units 242a have the shape of a circular sheet. However, the disclosure is not limited thereto. The first carrier and the second carrier may also have the shape of a square disk or the like, and the light filter units 232a and the wave filter units 242a of different specifications may also be disposed on the first carrier 231a and the second carrier 241a at different distances. Furthermore, the number of the light filter units 232a and the wave filter units 242a may be the same or different.

Referring to FIG. 1 and FIG. 2A and FIG. 2B at the same time, according to the visualization device for a flow field of the first embodiment of the disclosure, the flow field observation module 200 selects an appropriate light filter unit 232a of the light filter component 230 according to the light intensity information in the chamber 100 obtained by the light detecting component 220, and then the high-speed camera 202 captures an image of the fluid particle excited by the plasma 114 toward the chamber 100 via the selected light filter unit 232a. Alternatively, the flow field observation module 200 selects an appropriate wave filter unit 242a of the wave filter component 240 according to the light wavelength information in the chamber 100 obtained by the light detecting component 220, and then the high-speed camera 202 captures an image of the fluid particle excited by the plasma 114 toward the chamber 100 via the selected wave filter unit 242a. That is, the high-speed camera 202 captures an image of the fluid particle excited by the plasma 114 toward the chamber 100 at least via one of the light filter component 230 and the wave filter component 240. It should be noted that, in another embodiment, the wave filter component 240 may be omitted directly, and only the light filter component 230 is provided instead.

Referring to FIG. 2B, the first carrier 231a has a first axis of rotation, and the second carrier 241a has a second axis of rotation. In the present embodiment, the first axis of rotation is the same as the second axis of rotation, and both are geometric center axes of rotation. The first carrier 231a may be rotated by only driving one of the axes of rotation such that one light filter unit 232a and one wave filter unit 242a are overlapped. Alternatively, the second carrier 241a may be rotated by only driving one axis of rotation such that one wave filter unit 242a and one light filter unit 232a are overlapped. Further, the two axes of rotation may be simultaneously driven to rotate the first carrier 231a and the second carrier 241a such that one light filter unit 232a and one wave filter unit 242a are overlapped.

As shown in FIG. 1, FIG. 2A, and FIG. 2B, in still another embodiment, the high-speed camera 202 captures an image of a fluid particle excited by the plasma 114 toward the chamber 100 via at least one of the light filter component 230 and the wave filter component 240. That is to say, when the high-speed camera 202 performs image capture, the light filter unit 232a and the wave filter unit 242a may not be overlapped. For example, in FIG. 2A, another embodiment may be realized by replacing the placement of one light filter unit 232a and one wave filter unit 242a with a light-transmitting sheet or a through-hole. It should be noted that, in another embodiment, the wave filter component 240 may be omitted directly, and only the light filter component 230 is provided instead.

Figure 3A:
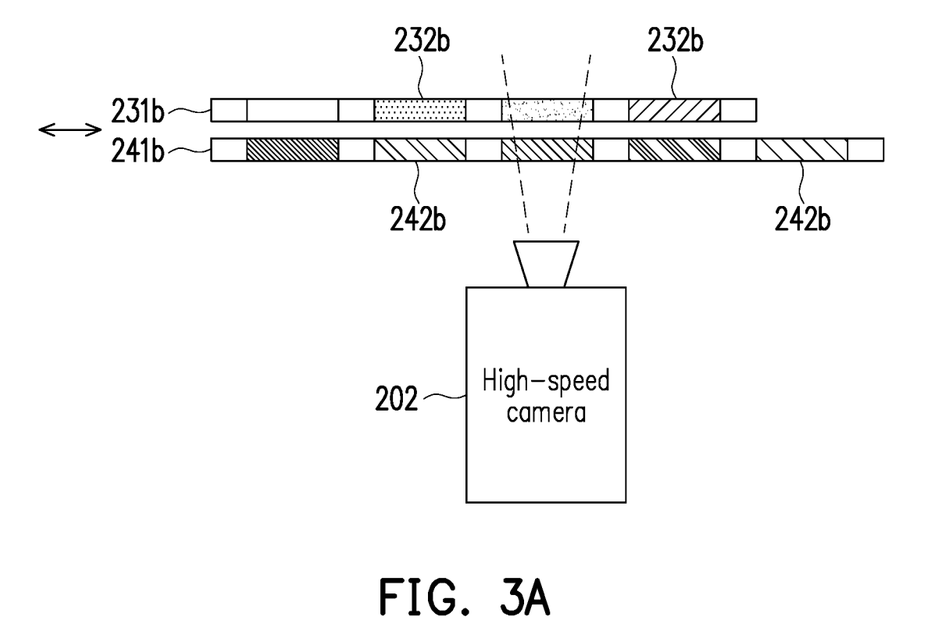
FIG. 3A and FIG. 3B are schematics of another example of a light filter component and a wave filter component in the visualization device for a flow field of the first embodiment.
Figure 3B:
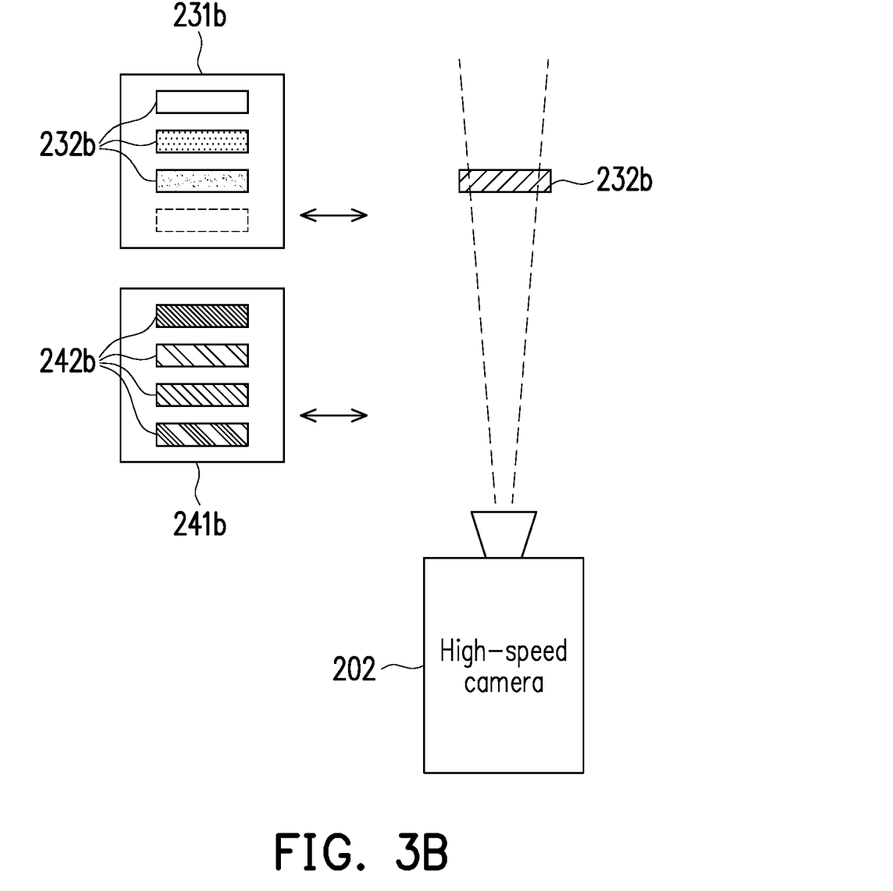

FIG. 3A and FIG. 3B are schematics of another embodiment of a light filter component and a wave filter component in the visualization device for a flow field of the first embodiment. Different from FIG. 2A and FIG. 2B are the types of the first carrier and the second carrier.

In FIG. 3A, a first carrier 231b and a second carrier 241b are relatively translatable such that one light filter unit 232b and one wave filter unit 242b are overlapped.

In FIG. 3B, the first carrier 231b and the second carrier 241b respectively house a plurality of light filter units 232b and a plurality of wave filter units 242b outside the image capture range of the high-speed camera 202.

Referring to FIG. 1 and FIG. 3A and FIG. 3B at the same time, in the present embodiment, after the flow field observation module 200 selects an appropriate light filter unit 232b of the light filter component 230 according to the light intensity information in the chamber 100 obtained by the light detecting component 220, the selected light filter unit 231b is moved to within the image capture range of the high-speed camera 202, and then the high-speed camera 202 captures an image of the fluid particle excited by the plasma 114 toward the chamber 100 via the selected light filter unit 232b. In another embodiment, after the flow field observation module 200 selects an appropriate wave filter unit 242b of the wave filter component 240b according to the light wavelength information in the chamber 100 obtained by the light detecting component 220, the selected wave filter unit 242b is moved within the image capture range of the high-speed camera 202, and then the high-speed camera 202 captures an image of the fluid particle excited by the plasma 114 toward the chamber 100 via the selected wave filter unit 242b.

As shown in FIG. 1, FIG. 3A, and FIG. 3B, in the present embodiment, the high-speed camera 202 captures an image of a fluid particle excited by the plasma 114 toward the chamber 100 via at least one of the light filter component 230 and the wave filter component 240. That is to say, when the high-speed camera 202 is performing image capture, the light filter unit 232b and the wave filter unit 242b may not be overlapped. For example, in FIG. 3A and FIG. 3B, another embodiment may be realized by replacing the placement of one light filter unit 232b and one wave filter unit 242b with a light-transmitting sheet or a through-hole. Furthermore, the number of the light filter units 232b and the wave filter units 242b may be the same or different.

According to the visualization device for a flow field of the first embodiment of the disclosure, in the present embodiment, the flow field observation module 200 selects an appropriate light filter unit 232b of the light filter component 230 according to the light intensity information in the chamber 100 obtained by the light detecting component 220, and then the high-speed camera 202 captures an image of the fluid particle excited by the plasma 114 toward the chamber 100 via the selected light filter unit 232b. Alternatively, the flow field observation module 200 selects an appropriate wave filter unit 242b of the wave filter component 240 according to the light wavelength information in the chamber 100 obtained by the light detecting component 220, and then the high-speed camera 202 captures an image of the fluid particle excited by the plasma 114 toward the chamber 100 via the selected wave filter unit 242b. It should be noted that, in another embodiment, the wave filter component 240 may be omitted, and only the light filter component 230 is provided instead.

Figure 4A:
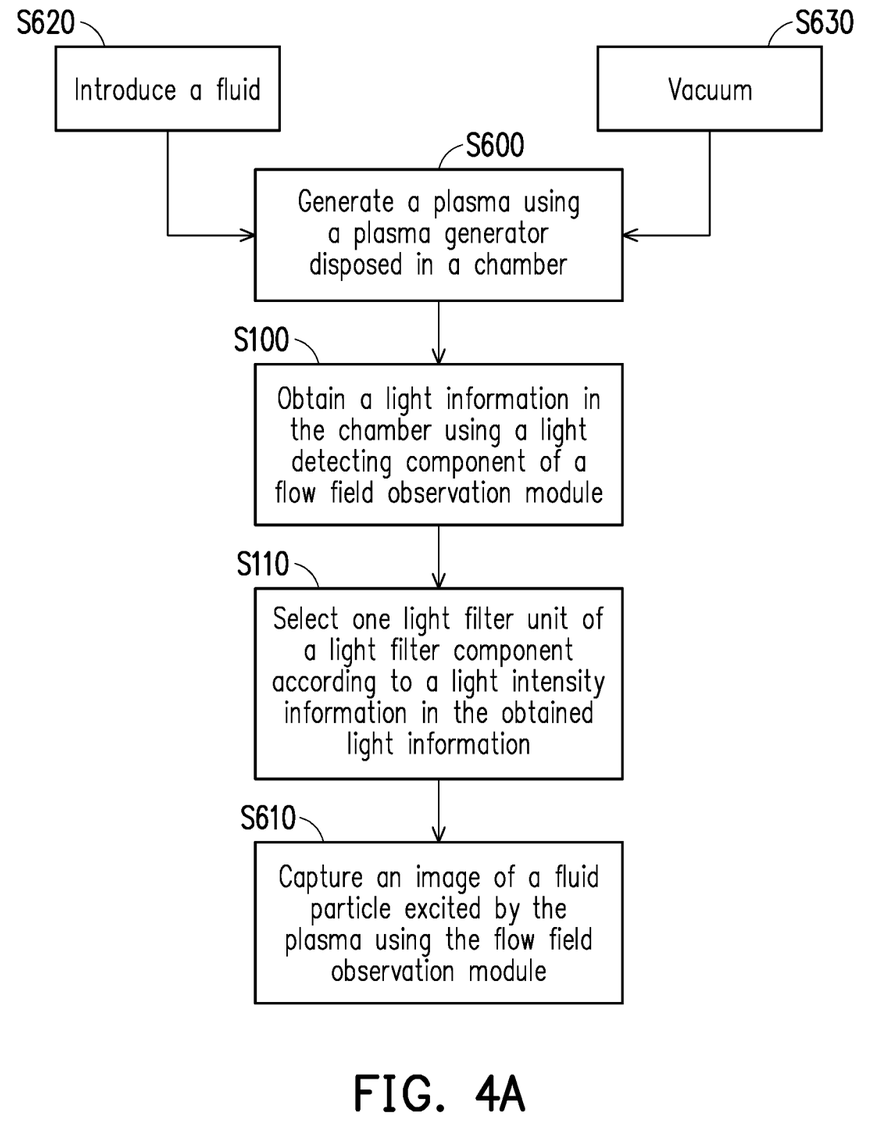
FIG. 4A and FIG. 4B are step diagrams of two observation methods for a flow field according to the second embodiment of the disclosure.
Figure 4B:
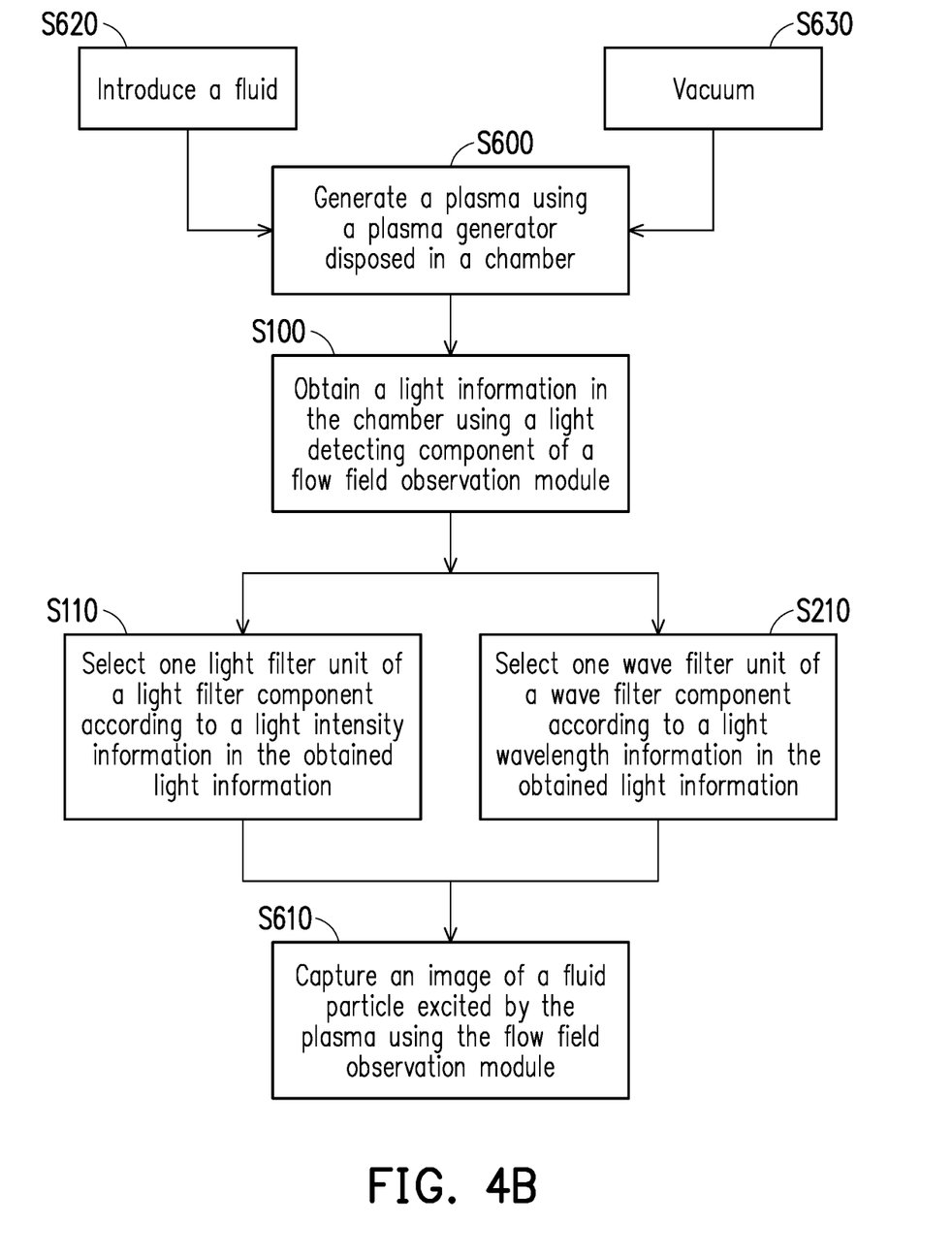

FIG. 4A and FIG. 4B are step diagrams of two observation methods for a flow field according to the second embodiment of the disclosure.

Referring first to FIG. 4A, step S600 is performed to generate a plasma using a plasma generator disposed in a chamber, wherein the plasma generator includes a pair of electrodes as described in the first embodiment.

Then, at least one flow field observation module is disposed outside the chamber, and the flow field observation module includes a high-speed camera, a light detecting component, and a light filter component. Moreover, the light detecting component and the light filter component are disposed between the high-speed camera and the chamber. In step S610, the flow field observation module captures an image of a fluid particle excited by the plasma toward the chamber.

In addition, before step S610 is performed, the light detecting component of the flow field observation module may be used first to obtain a light information in the chamber (step S100), and the light information contains at least one of a light intensity information and a light wavelength information; in the embodiment of FIG. 4A, one light filter unit of the light filter component is selected according to the light intensity information in the obtained light information (step S110), and then the high-speed camera of the flow field observation module captures an image of a fluid particle excited by the plasma toward the chamber via the selected light filter unit (step S610).

In another embodiment of FIG. 4B, the flow field observation module further includes a wave filter component disposed between the high-speed camera and the chamber, and the wave filter component includes a plurality of wave filter units. Before step S610 is performed, the light detecting component of the flow field observation module is first used to obtain the light information in the chamber (step S100), and one light filter unit of the light filter component is selected according to the light intensity information in the obtained light information (step S110). In addition, before step S610 is performed, one wave filter unit of the wave filter component may also be selected according to the light wavelength information in the obtained light information (step S210), and then the high-speed camera of the flow field observation module captures an image of a fluid particle excited by the plasma toward the chamber via the selected wave filter unit (step S610). It should be noted that the flow field observation module may select at least one of a light filter unit and a wave filter unit according to the light information obtained by the light detecting component, and the high-speed camera of the flow field observation module may capture an image of the fluid particle excited by the plasma toward the chamber via at least one of the selected light filter unit and wave filter unit.

In detail, in step S110 and step S210, the light filter component includes a first carrier and a plurality of light filter units, and the plurality of light filter units are disposed on the first carrier and each light filter unit contains one light filter. The wave filter component includes a second carrier and a plurality of wave filter units, the plurality of wave filter units are disposed on the second carrier, and each wave filter unit contains one wave filter. The selection of the light filter unit and the wave filter unit is as provided for the flow field visualization device of the above embodiment. In an embodiment, the first carrier and the second carrier have a common axis of rotation, and before the image of the fluid particle excited by the plasma is captured, the first carrier and the second carrier are rotated according to a common axis of rotation, such that one light filter unit and one wave filter unit are overlapped. In another embodiment, the first carrier and the second carrier are relatively translatable, and the first carrier and the second carrier are relatively translated before the image of the fluid particle excited by the plasma is captured, such that one light filter unit and one wave filter unit are overlapped.

In the observation method for a flow field according to the second embodiment of the disclosure, the high-speed camera of the flow field observation module captures an image of a fluid particle excited by the plasma toward the chamber via at least one of the light filter component and the wave filter component.

In addition, before step S600 is performed, a fluid may be first introduced into the chamber (step S620), and the introduced fluid is, for example, an inert gas. Further, if the flow field to be tested is for a low-pressure vacuum state, then the chamber needs to be vacuumed before step S600 is performed (step S630).

In the observation method for a flow field according to the second embodiment of the disclosure, a gas may be excited by plasma to emit light, and frequency is adjusted by a high-speed camera for global velocity field image capture. Then, a global area or volume is configured using a computer host and then divided into multiple equal areas (to prevent gas particles from moving too fast and causing pairing error) so as to track the movement of the gas particles in space and record the result into a flow field velocity map.

It will be apparent to those skilled in the art that various modifications and variations may be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A visualization device for a flow field, comprising:
    a chamber;
    a power supply outputting a voltage to generate a plasma;
    at least one pair of electrodes disposed in the chamber, wherein the at least one pair of electrodes excites a fluid in the chamber via the voltage from the power supply to generate the plasma; and
    at least one flow field observation module disposed outside the chamber and capturing an image of a fluid particle excited by the plasma toward the chamber, the flow field observation module comprising:
        a high-speed camera;
        a light filter component disposed between the high-speed camera and the chamber; and
        a light detecting component obtaining a light information within the chamber and sending the light information to the light filter component.

2. The visualization device for the flow field of claim 1, further comprising a vacuum equipment for maintaining a vacuum state in the chamber.

3. The visualization device for the flow field of claim 1, wherein the fluid comprises an inert gas.

4. The visualization device for the flow field of claim 1, wherein the high-speed camera captures the image of the fluid particle excited by the plasma toward the chamber via at least one of the light filter component and a wave filter component.

5. The visualization device for the flow field of claim 1, wherein the light filter component comprises a plurality of light filter units.

6. The visualization device for the flow field of claim 5, wherein the flow field observation module selects one of the light filter units in the light filter component according to a light intensity information in the light information in the chamber obtained by the light detecting component, such that the high-speed camera captures the image of the fluid particle excited by the plasma toward the chamber via the selected light filter unit.

7. The visualization device for the flow field of claim 5, wherein the flow field observation module further comprises a wave filter component disposed between the high-speed camera and the chamber; the wave filter component comprises a plurality of wave filter units; and the flow field observation module selects one of the wave filter units in the wave filter component according to a light wavelength information in the light information in the chamber obtained by the light detecting component, such that the high-speed camera captures the image of the fluid particle excited by the plasma toward the chamber via the selected wave filter unit.

8. The visualization device for the flow field of claim 7, wherein the light filter component comprises a first carrier, and the plurality of light filter units are disposed on the first carrier; and the wave filter component comprises a second carrier, and the plurality of wave filter units are disposed on the second carrier.

9. The visualization device for the flow field of claim 8, wherein the first carrier has a first axis of rotation, and the first carrier is rotated according to the first axis of rotation such that one of the light filter units and one of the wave filter units are overlapped.

10. The visualization device for the flow field of claim 8, wherein the second carrier has a second axis of rotation, and the second carrier is rotated according to the second axis of rotation such that one of the wave filter units and one of the light filter units are overlapped.

11. The visualization device for the flow field of claim 8, wherein the first carrier and the second carrier have a common axis of rotation, and the first carrier and the second carrier are rotated according to the common axis of rotation such that one of the light filter units and one of the wave filter units are overlapped.

12. The visualization device for the flow field of claim 8, wherein the first carrier and the second carrier are relatively translatable such that one of the light filter units and one of the wave filter units are overlapped.

13. An observation method for a flow field, comprising:
    generating a plasma using a plasma generator disposed in a chamber, wherein the plasma generator comprises at least one pair of electrodes;
    disposing at least one flow field observation module outside the chamber, wherein the flow field observation module comprises a high-speed camera, a light detecting component, and a light filter component, and the light detecting component and the light filter component are disposed between the high-speed camera and the chamber;
    obtaining a light information in the chamber using the light detecting component of the flow field observation module and sending the light information to the light filter component; and
    capturing an image of a fluid particle excited by the plasma toward the chamber via the light filter component using the high-speed camera of the flow field observation module.

14. The observation method for the flow field of claim 13, further comprising, before the plasma is generated, introducing a fluid into the chamber, wherein the fluid comprises an inert gas.

15. The observation method for the flow field of claim 13, further comprising, before the plasma is generated, vacuuming the chamber.

16. The observation method for the flow field of claim 13, wherein the light filter component comprises a plurality of light filter units.

17. The observation method for the flow field of claim 16, further comprising, after a light intensity information in the light information in the chamber is obtained and before the image of the fluid particle excited by the plasma is captured, selecting one of the light filter units of the light filter component according to the light intensity information such that the high-speed camera captures the image of the fluid particle excited by the plasma toward the chamber via the selected light filter unit.

18. The observation method for the flow field of claim 16, wherein the flow field observation module further comprises a wave filter component disposed between the high-speed camera and the chamber, and the wave filter component comprises a plurality of wave filter units; and further comprising, after a light wavelength information in the light information in the chamber is obtained and before the image of the fluid particle excited by the plasma is captured, selecting one of the wave filter units of the wave filter component according to the light wavelength information such that the high-speed camera captures the image of the fluid particle excited by the plasma toward the chamber via the selected wave filter unit.

19. The observation method for the flow field of claim 18, wherein the light filter component comprises a first carrier and a plurality of light filter units, and the plurality of light filter units are disposed on the first carrier and each of the light filter units contains a light filter; the wave filter component comprises a second carrier and a plurality of wave filter units, and the plurality of wave filter units are disposed on the second carrier and each of the wave filter units contains a wave filter, wherein the first carrier and the second carrier have a common axis of rotation; and further comprising, before the image of the fluid particle excited by the plasma is captured: rotating the first carrier and the second carrier according to the common axis of rotation such that one of the light filter units and one of the wave filter units are overlapped.

20. The observation method for the flow field of claim 18, wherein the light filter component comprises a first carrier and a plurality of light filter units, and the plurality of light filter units are disposed on the first carrier and each of the light filter units contains a light filter; the wave filter component comprises a second carrier and a plurality of wave filter units, and the plurality of wave filter units are disposed on the second carrier and each of the wave filter units contains a wave filter, wherein the first carrier and the second carrier are relatively translatable; and further comprising, before the image of the fluid particle excited by the plasma is captured: relatively translating the first carrier and the second carrier such that one of the light filter units and one of the wave filter units are overlapped.

\* \* \* \* \*